US009604585B2

(12) United States Patent
Joyce et al.

(10) Patent No.: US 9,604,585 B2
(45) Date of Patent: Mar. 28, 2017

(54) FAILURE MANAGEMENT IN A VEHICLE

(71) Applicant: Ford Global Technologies, LLC, Dearborn, MI (US)

(72) Inventors: John P. Joyce, West Bloomfield, MI (US); Scott J. Lauffer, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/663,917

(22) Filed: Mar. 20, 2015

(65) Prior Publication Data

US 2016/0009235 A1     Jan. 14, 2016

Related U.S. Application Data

(60) Provisional application No. 62/023,396, filed on Jul. 11, 2014.

(51) Int. Cl.
| | |
|---|---|
| *G05D 1/00* | (2006.01) |
| *G06F 11/00* | (2006.01) |
| *B60R 16/023* | (2006.01) |
| *B60R 16/03* | (2006.01) |

(52) U.S. Cl.
CPC .......... *B60R 16/0232* (2013.01); *B60R 16/03* (2013.01); *G05D 1/0077* (2013.01); *G05D 2201/0213* (2013.01)

(58) Field of Classification Search
USPC .............................................. 701/24; 714/11
See application file for complete search history.

(56) References Cited

U.S. PATENT DOCUMENTS

| | | | |
|---|---|---|---|
| 4,347,563 A | 8/1982 | Paredes et al. | |
| 5,136,498 A | 8/1992 | McLaughlin et al. | |
| 6,141,769 A * | 10/2000 | Petivan | G06F 11/165 714/10 |
| 6,178,947 B1 * | 1/2001 | Machida | F02D 11/106 123/396 |
| 6,856,045 B1 * | 2/2005 | Beneditz | G06F 1/263 307/10.1 |
| 7,170,853 B2 * | 1/2007 | Remboski | H04L 12/42 370/225 |

(Continued)

FOREIGN PATENT DOCUMENTS

EP     0077153     4/1983

OTHER PUBLICATIONS

National Instruments, "Redundant System Basic Concepts", Published Jan. 11, 2008; http://www.ni.com/niglobal/.

(Continued)

*Primary Examiner* — Tyler Paige
(74) *Attorney, Agent, or Firm* — Frank MacKenzie; Bejin Bieneman PLC

(57) ABSTRACT

A system includes first and second failsafe devices. Each of the failsafe devices includes a processor and a memory. The memory stores instructions executable by the processor for performing at least one of detecting a fault and providing a communication concerning a fault. The system further includes an arbitration bus connecting the first and second failsafe devices. The communication concerning the fault may be provided from a first one of the first and second failsafe devices to a second one of the first and second failsafe devices.

18 Claims, 5 Drawing Sheets

(56) References Cited

U.S. PATENT DOCUMENTS

| | | | | |
|---|---|---|---|---|
| 7,877,627 B1* | 1/2011 | Freydel | G06F 11/1633 | |
| | | | 714/11 | |
| 8,567,552 B2* | 10/2013 | Sugai | B62D 5/001 | |
| | | | 180/402 | |
| 9,174,649 B1* | 11/2015 | Johri | B62D 6/00 | |
| 2002/0194551 A1* | 12/2002 | Mueller | F02D 41/2493 | |
| | | | 714/48 | |
| 2005/0203684 A1* | 9/2005 | Borgesson | B60K 35/00 | |
| | | | 701/36 | |
| 2006/0126256 A1* | 6/2006 | Forest | B60W 50/029 | |
| | | | 361/139 | |
| 2006/0247832 A1* | 11/2006 | Taki | G06Q 10/02 | |
| | | | 701/31.4 | |
| 2006/0294422 A1* | 12/2006 | Fukuda | G06F 9/4881 | |
| | | | 714/15 | |
| 2007/0067082 A1* | 3/2007 | Watts | B60R 21/013 | |
| | | | 701/45 | |
| 2007/0240016 A1* | 10/2007 | Anderson | G06F 11/20 | |
| | | | 714/11 | |
| 2007/0299587 A1* | 12/2007 | Breed | B60R 21/013 | |
| | | | 701/45 | |
| 2008/0258253 A1* | 10/2008 | Fey | G05B 19/0428 | |
| | | | 257/500 | |
| 2009/0113108 A1* | 4/2009 | Becker | G06F 13/4027 | |
| | | | 710/306 | |
| 2010/0153615 A1* | 6/2010 | Baba | G06F 13/4022 | |
| | | | 710/316 | |
| 2012/0136540 A1* | 5/2012 | Miller | B62D 5/001 | |
| | | | 701/42 | |
| 2013/0067465 A1* | 3/2013 | Fuhrman | G06F 9/5077 | |
| | | | 718/1 | |
| 2013/0204493 A1 | 8/2013 | Ricci et al. | | |
| 2014/0081509 A1* | 3/2014 | Koch | G07C 5/0808 | |
| | | | 701/29.2 | |

OTHER PUBLICATIONS

GB Search Report for Application No. GB1511668.4 dated Jan. 7, 2016.

* cited by examiner

FAILURE MANAGEMENT IN A VEHICLE

CROSS-REFERENCE TO RELATED APPLICATION

This application claims priority to U.S. Provisional Patent Application No. 62/023,396, titled "FAILURE MANAGEMENT IN A VEHICLE" and filed on Jul. 11, 2014, the contents of which are hereby incorporated by reference in its entirety.

BACKGROUND

An autonomous vehicle, i.e., a vehicle in which some or all operations conventionally controlled by a human driver are controlled and carried out by components in the vehicle without driver intervention, depends upon maintaining and coordinating key sub-system functions in the event of a failure. For example, relevant failures could include power failures, communication failures and failures of logic devices. A failure to deliver power to a vehicle powertrain, brake sub-system, steering sub-system, etc., along with the resulting failure of vehicle operations, could put a vehicle driver and/or other vehicle occupants at risk. Unfortunately, present mechanisms are lacking for addressing a power failure with respect to one or more sub-systems in an autonomous vehicle.

DETAILED DESCRIPTION

Unfortunately, present mechanisms are lacking for addressing a power failure with respect to one or more sub systems in an autonomous vehicle. One way to address such power failures includes a vehicle system that includes first and second failsafe devices. Each failsafe device includes a processor and a memory. The memory stores instructions executable by the processor for performing at least one of detecting a fault and providing a communication concerning the fault. The vehicle system further includes an arbitration bus connecting the first and second failsafe devices. The communication concerning the fault may be provided from one of the failsafe devices to another of the failsafe devices.

The elements shown may take many different forms and include multiple and/or alternate components and facilities. The example components illustrated are not intended to be limiting. Indeed, additional or alternative components and/or implementations may be used.

Figure 1:
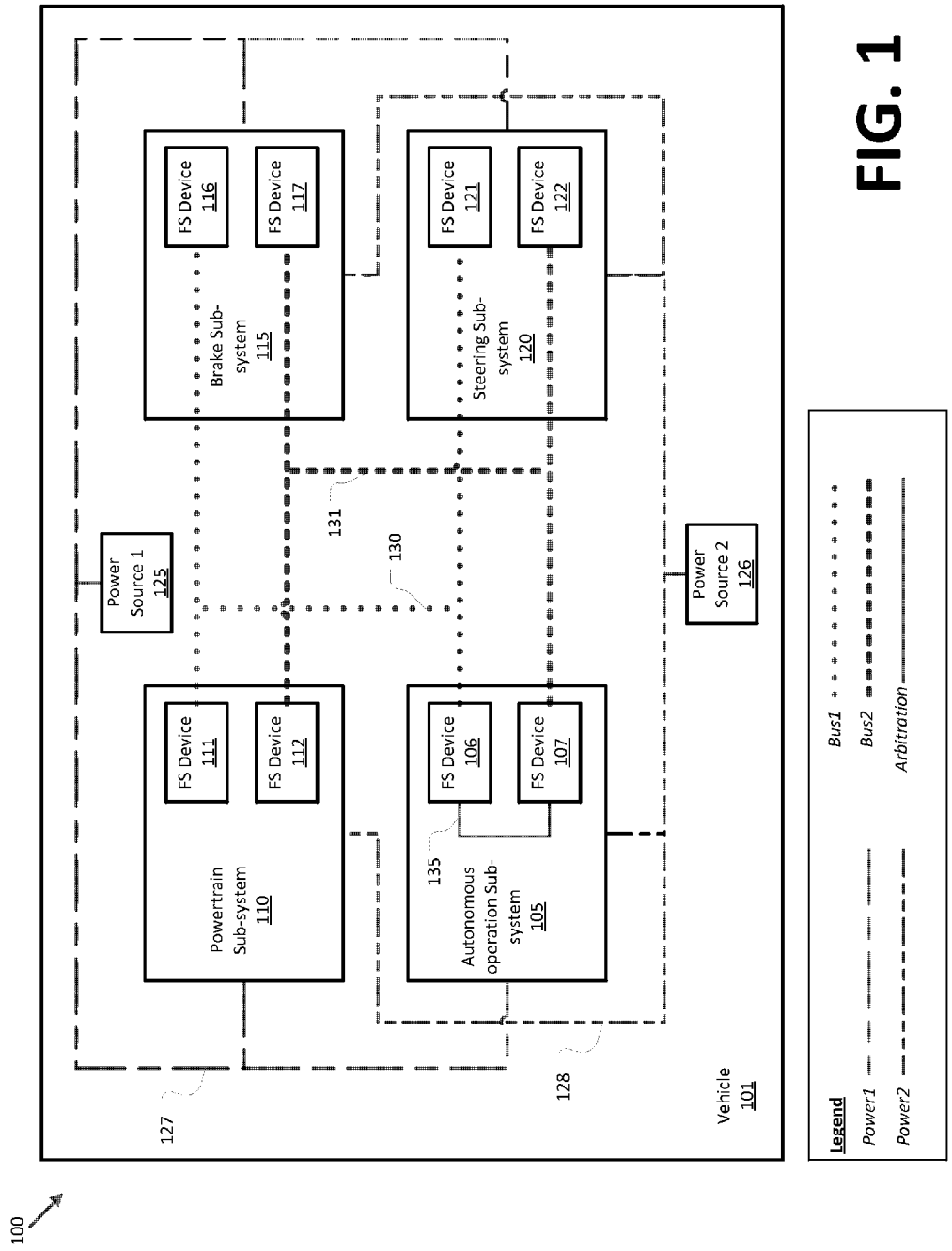
FIG. 1 is a block diagram of an example of a vehicle failure management sub-system.

FIG. 1 is a block diagram of an exemplary vehicle failure management system 100. A vehicle 101 includes an autonomous operation sub-system 105 comprising first and second failsafe sub-systems 106, 107 that are each a combination of software and hardware for performing various operations. For example, each of the failsafe devices 106, 107 may be programmed for receiving and processing sensor data, receiving and processing data from various vehicle 101 components, and for providing information and instructions to various vehicle 101 components to support various autonomous actions, i.e., vehicle 101 operations performed without intervention or controlled by a human operator. Accordingly, the each of the devices 106, 107 generally includes multiple processors and a memory, the memory including one or more forms of computer-readable media, and storing instructions executable by the processor for performing various operations, including as disclosed herein, whereby the sub-system 105 includes programming for conducting various operations. Further, each of the devices 106, 107 is constructed with redundant components, monitoring functions, and programming that render it capable of detecting failures within itself and completely disabling or substantially reducing its function in the event a failure is detected.

The sub-system 105 is connected to first and second power sources 125, 126, as well as first and second communications buses 130, 131, which, by way of example and not limitation, may be configured for communications as controller area network (CAN) buses or the like, and/or may use other communications mechanisms and/or protocols. Via the buses 130, 131, and/or other wired and/or wireless mechanisms, the autonomous operation sub-system 105 may transmit messages to various devices or sub-systems in a vehicle 101, and/or receive messages from the various devices, e.g., controllers, actuators, sensors, etc.

Via the buses 130, 131, the sub-system 105 is in communication with various vehicle 101 components, including a powertrain sub-system 110, a brake sub-system 115, and/or a steering sub-system 120, and or other sub-systems, such as a vehicle 101 lighting control sub-system (not shown). Each of the sub-systems 110, 115, and 120, like the autonomous operation sub-system 105, comprise respective failsafe devices 111, 112, 116, 117, 121, and 122, each of which includes a combination of software and hardware, i.e., a processor, and a memory storing instructions executable by the processor, for performing operations including those described herein as well as other operations. For example, the powertrain sub-system 110 includes devices 111, 112 that are generally programmed to perform operations for controlling a vehicle 101 powertrain, the brake sub-system 115 includes devices 115 that may be programmed to perform operations for controlling vehicle 101 brakes, the steering sub-system 120 includes devices 121, 122 that may be programmed to perform operations for controlling vehicle 101 steering, etc. As with the devices 106, 107 described above, each of the devices 111, 112, 116, 117, 121, and 122 is generally constructed with redundant components, monitoring functions, and programming that render it capable of detecting failures within itself and completely disabling or substantially reducing its function in the event a failure is detected.

The failsafe devices 106, 107 are each programmed to react to internal faults or failure, faults or failures in each other, and faults or failures in other sub-systems. Moreover, each of the failsafe devices 106, 107 may have internal failure-handling mechanisms, e.g., multiple microprocessors and/or other mechanisms for independently executing programming for carrying out operations of a respective other failsafe device 106, 107. For example, first and second microprocessors in a failsafe device 106 or 107 could each generate a result, and compare their results with one another. If the results did not match, the device 106 or 107 could declare a fault and cease operations, send a notification to another device 106, 107 relating to the fault, etc.

Each failsafe device 106, 107, as mentioned above, is further programmed to perform independently operations of the sub-system 105, although one or both of the failsafe devices 106, 107 may not perform all operations of the sub-system 105 and/or may not perform operations of the sub-system 105 as quickly or efficiently as the sub-system 105. Each of the failsafe devices 106, 107 is connected to one of the communications buses 130, 131, e.g., as seen in FIG. 1, the failsafe device 106 is connected to the first communications bus 130, and the second failsafe device 107 is connected to the second communications bus 131.

Each of the sub-systems 110, 115, and 120 has an architecture similar to that just described of the sub-system 105. For example, the powertrain sub-system 110 includes or is communicatively coupled to first and second failsafe devices 111, 112, the devices 111, 112 being connected to buses 130, 131, respectively. The brake sub-system 115 includes or is communicatively coupled to failsafe devices 116, 117, connected to the buses 130, 131 respectively. The steering sub-system 120 includes or is communicatively coupled to failsafe devices 121, 122, connected to the buses 130, 131 respectively. The failsafe devices 111, 112, 116, 117, 121, 122 further generally include internal failure-handling mechanisms such as discussed above with respect to the devices 106, 107. Moreover, each failsafe device in one of the respective pairs of devices 111 and 112, 116 and 117, as well as 121 and 122, may be connected to a same and/or different actuators, e.g., to provide instructions for performing operations of the sub-system 110, 115, or 120, such as controlling a vehicle 101 powertrain, brakes steering, etc.

Further, the sub-systems 110, 115, and/or 120 may include other failsafe devices, power connections, and communication connections, in addition to those shown in FIG. 1. For example, the powertrain sub-system 110 in particular may warrant further redundancy and/or provide alternative or additional failover options, such as a "coast-down" mode in the event of a powertrain sub-system 110 failure. Moreover, the autonomous operation sub-system 105 may include additional failsafe devices, power connections, and communication connections in addition to those shown therein.

The sub-system 100 further includes at least one arbitration bus 135 between failsafe devices. An "arbitration bus" or "arbitration" is defined for purposes of this disclosure as a communications connection or link between two failsafe devices in a vehicle 101 sub-system, as well as programming in at least one of the devices, and/or in a microprocessor of the bus 135 itself, for implementing logic to determine an action to take upon detecting a fault or failure.

In the example of FIG. 1, an arbitration 135 is provided in and/or between the failsafe devices 106, 107 in the autonomous operation sub-system 105, the arbitration 135 including programming for determining which of the two communications buses 130, 131 to use for communications with various vehicle 101 sub-systems 110, 115, 120, etc. Unlike other examples discussed below, in this example, arbitration 135 is included only in the autonomous operation sub-system 105.

The arbitration 135 may detect a fault in or associated with one of the buses 130, 131 in a variety of ways. For example, in one scenario, the bus 130 may be a primary communications bus, and the bus 131 may be a backup, or secondary communications bus. In this scenario, the device 106 could receive a fault code or the like via one of the bus 130 from a one of the sub-systems 110, 115, or 120. The device 106 could then indicate via the arbitration bus 135 to its counterpart device 107 that a fault existed in the bus 130, whereupon the autonomous operation sub-system 105 could cease use of the primary bus 130, for which the fault was indicated, and switch over to the other bus 131.

Note that, although FIG. 1 illustrates failsafe devices 111, 112, 116, 117, 121, 122 in the various sub-systems 110, 115, 120, the failsafe devices 106, 107, and the arbitration 135, could operate without all, i.e., with only some, of these devices 111, 112, 116, 117, 121, 122. That is, although in an autonomous vehicle 101, failsafe devices 111, 112, 116, 117, 121, 122, alternate power sources 125, 126, etc., will generally be desirable, if some of these are omitted, it still could be possible that, so long as at least some of the devices 111, 112, 116, 117, 121, 122 are present, the example of FIG. 1 could still obtain data for the arbitration 135 from the sub-systems 110, 115, and 120.

In general, a centrally-located arbitration 135 such as illustrated in FIG. 1 depends upon programming devices 106, 107 in the autonomous operation sub-system 105 to process communications indicating a fault from the various sub-systems 110, 115, 120, etc. Such programming will depend on a knowledge of communications and programming logic implemented in the various sub-systems 110, 115, 120, etc. For example, the devices 106, 107 would have to recognize fault codes or the like provided from the various sub-systems 110, 115, 120.

Figure 2:
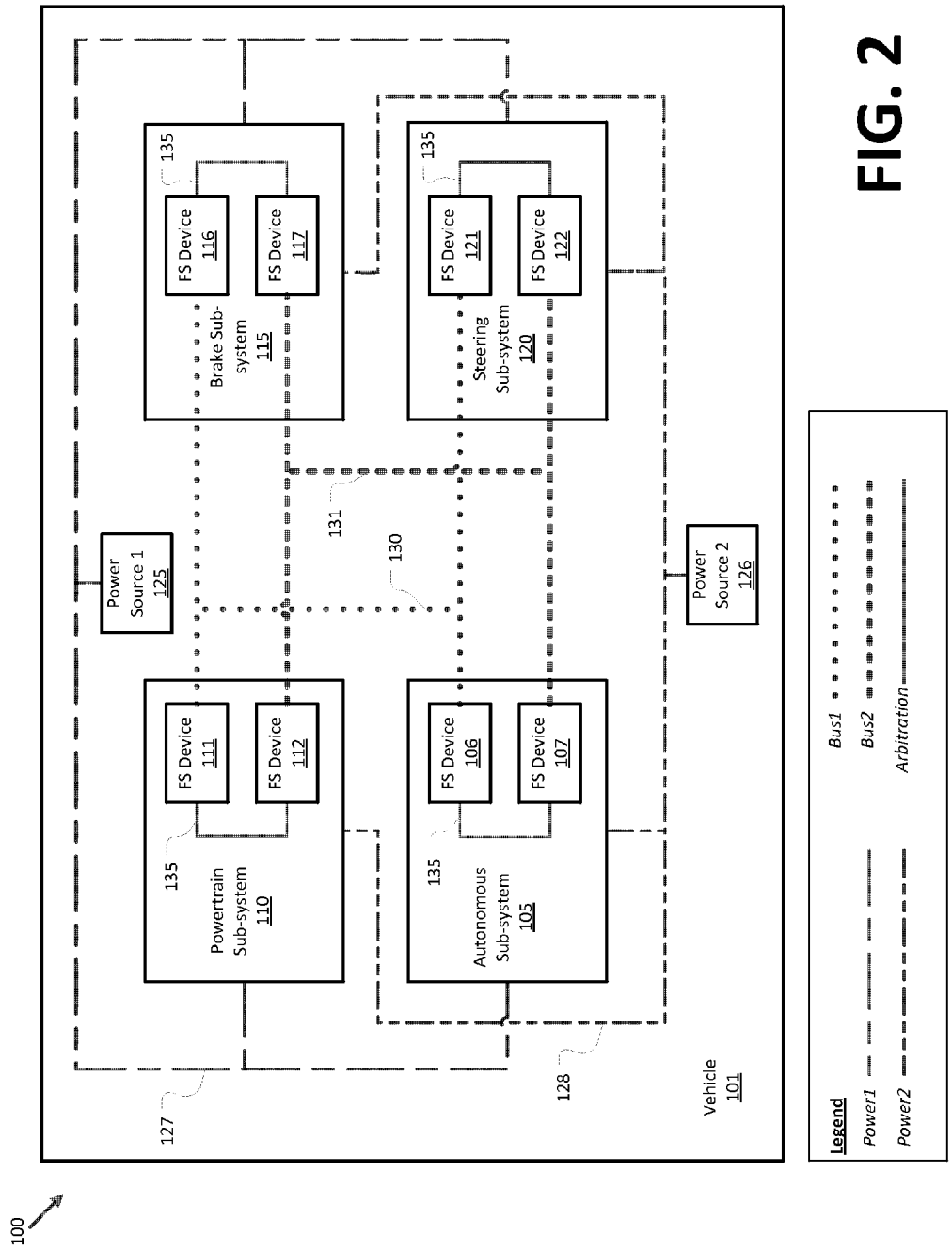
FIG. 2 is a block diagram of another example of a vehicle failure management sub-system.

FIG. 2 illustrates an example in which at least some, and as illustrated, all, of the sub-systems 110, 115, and 120 include an arbitration 135. For example, the powertrain sub-system 110 includes an arbitration 135 between the devices 111, 112. As mentioned above, the devices 111, 112 may be configured for internal fault detection, e.g., independent microprocessors within a device 111, 112 could be used to compute and compare results to determine the presence of a fault. Alternatively or additionally, a device 111, 112 could receive a fault condition externally, e.g., via one of the buses 130, 131, from an actuator or other component included in the sub-system 110, etc. In any event, upon detecting or determining a fault, a primary device 111, for example, could communicate via the arbitration bus 135 with a secondary device 112 to indicate the fault, whereupon the secondary device 112 could take over operations previously undertaken by the primary device 111. Further, the secondary device 112 could send a message via the bus 131 to the autonomous operation sub-system 105 indicating the fault condition and/or that communications from the sub-system 110 via the bus 130 should be ignored, and communications from the secondary bus 131 should be used. Moreover, the secondary device 112 is generally capable of assuming some or all of the operations of the primary device 111, at least to allow the powertrain sub-system 110 to operate, e.g., provide instructions for controlling a vehicle 101 powertrain, in a limp-home mode.

In the example of FIG. 2, a failover from a primary failsafe device 111 to a secondary device 112 (to continue using the example of the powertrain sub-system 110) could take a variety of forms. In one implementation, or for certain kinds of faults, the primary device 111 may transfer all operations to the secondary device 112, and moreover the secondary device 112 will conduct all communications via the secondary indications bus 131. However, in some implementations, the secondary device 112 may lack all of the capabilities of the primary device 111. Alternatively or additionally, the primary bus 130 may provide data not available and/or provided at a slower rate than the secondary bus 131. In this case, the arbitration bus 135 may be used to provide data to and from the primary bus 130 via the primary device 111 while the device 112 takes over operations from the device 111.

Figure 3:
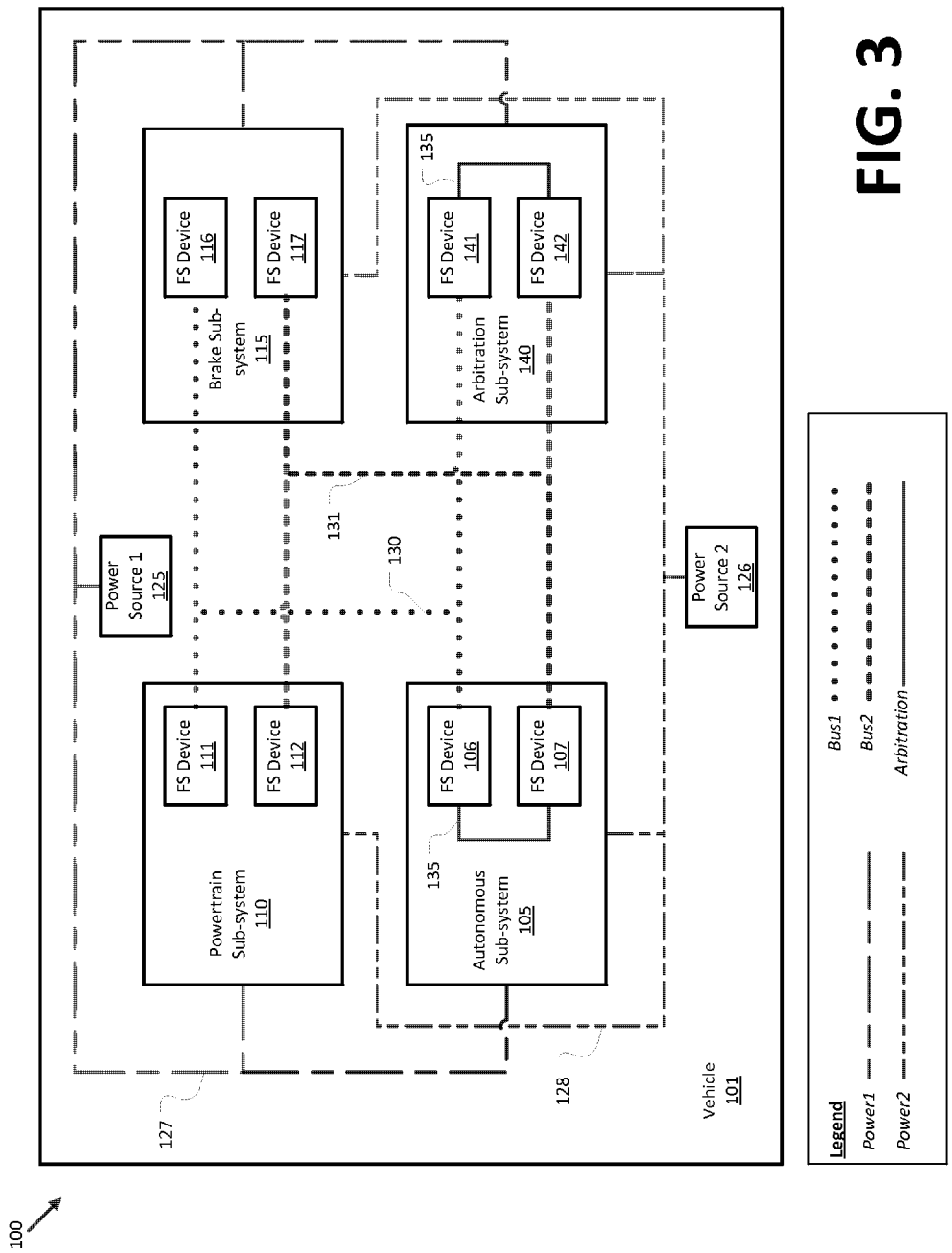
FIG. 3 is a block diagram of yet another example of a vehicle failure management sub-system.

FIG. 3 illustrates yet another example of failover determination. Although likely still present in the vehicle 101, for purposes of illustration the steering sub-system 120 has been replaced in FIG. 3 with an arbitration sub-system 140, including failsafe devices 141, 142, and an arbitration 135 therebetween. The arbitration sub-system 140 is provided to provide centralized arbitration for various sub-systems 110, 115, 120, etc., such centralized arbitration being separate from the autonomous operation sub-system 105. The arbitration 135 in the sub-system 140 generally operates in a manner described above with respect to the arbitration 135 of FIG. 1, with the added step of the sub-system 140 communicating via one of the buses 130, 131 to the sub-system 105 to indicate a presence of a fault condition, failover from a primary communication bus 132 a secondary communication bus 131, etc. Note that, in many implementations, it may be desirable to avoid the cost and other overhead of adding a separate arbitration sub-system 140, and one or more pairs of failsafe devices in existing vehicle 101 sub-systems 105, 110, 115, 120, etc. may be used to carry out operations ascribed herein to the sub-system 140 and the devices 141, 142.

The architecture illustrated with respect to FIG. 3 may be useful where one or more sub-systems 110, 115, 120, etc. in the vehicle 101 are capable of communicating only via one bus 130 or 131; an arbitration 135, which is a connection between devices respectively connected to the buses 130, 131, cannot be implemented in such a sub-system 110, 115, 120, etc Likewise, a sub-system 110, 115, 120, etc. could be supplied without failsafe devices.

A possibility not yet mentioned is failure of an arbitration bus 135. In this case, a secondary device 112 (again at using the powertrain sub-system 110 as a representative example) cannot determine whether a failure lies with the primary device 111 or the arbitration bus 135. Accordingly, the secondary device 112 may be programmed to communicate with other sub-systems 115, 120, etc., to determine if any of those sub-systems can communicate with the primary device 111. If so, a failure of the arbitration bus 135 between the devices 111, 112 may be diagnosed.

Figure 4:
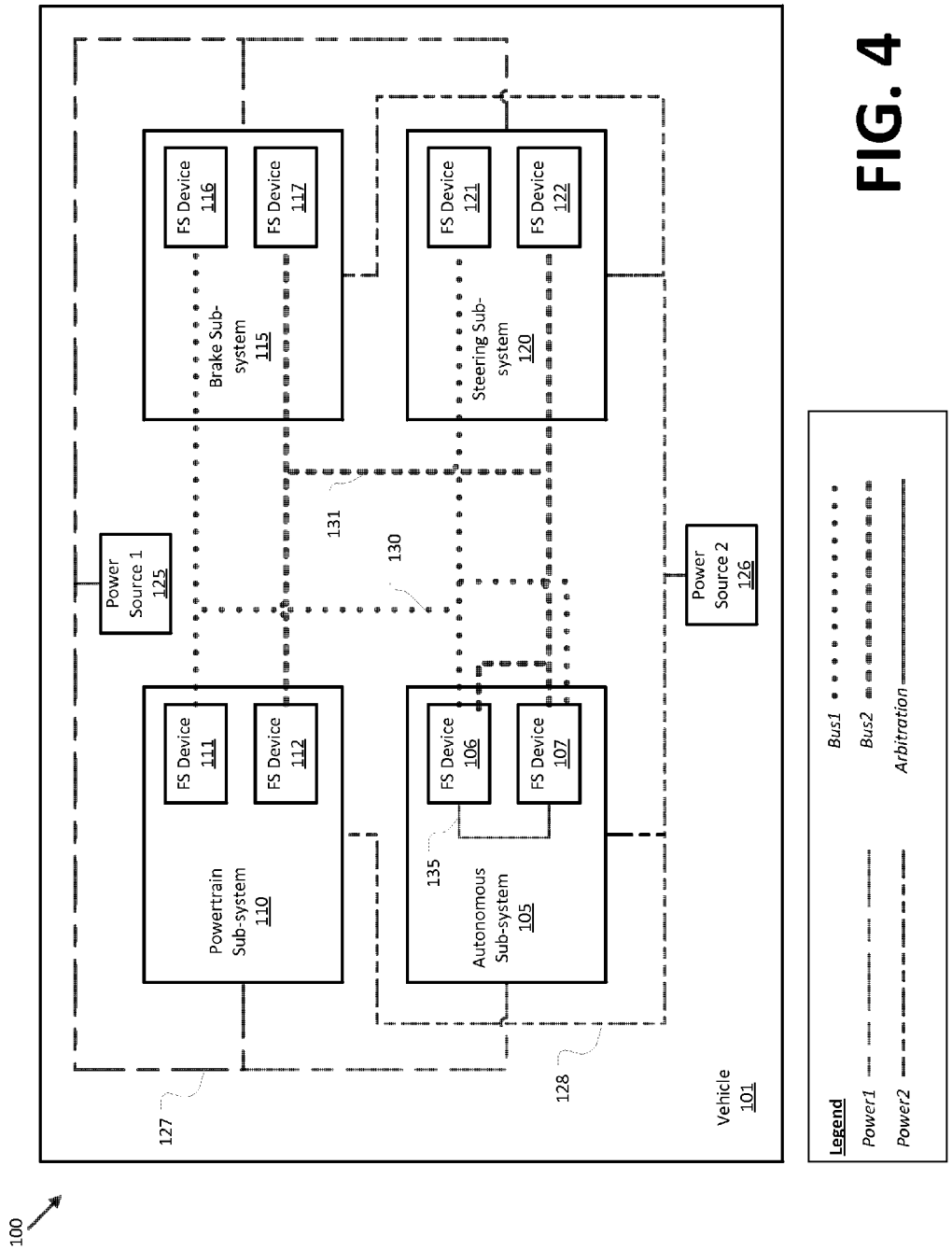
FIG. 4 is a block diagram of yet another example of a vehicle failure management sub-system.

FIG. 4 illustrates yet a further variation of the example of FIG. 1, in which each of the devices 106, 107 in the autonomous operation sub-system 105 are connected to both of the communications buses 130, 131. Accordingly, if a failure or fault occurs in one of the devices 106, 107, the other device 106, 107 can continue to carry out command and control operations of the autonomous operation sub-system 105 via either of the buses 130, 131 that may be operational. Likewise, if a fault occurs in one of the buses 130, 131, a device 106, 107 can continue operations without transferring control to the other device 106, 107.

Figure 5:
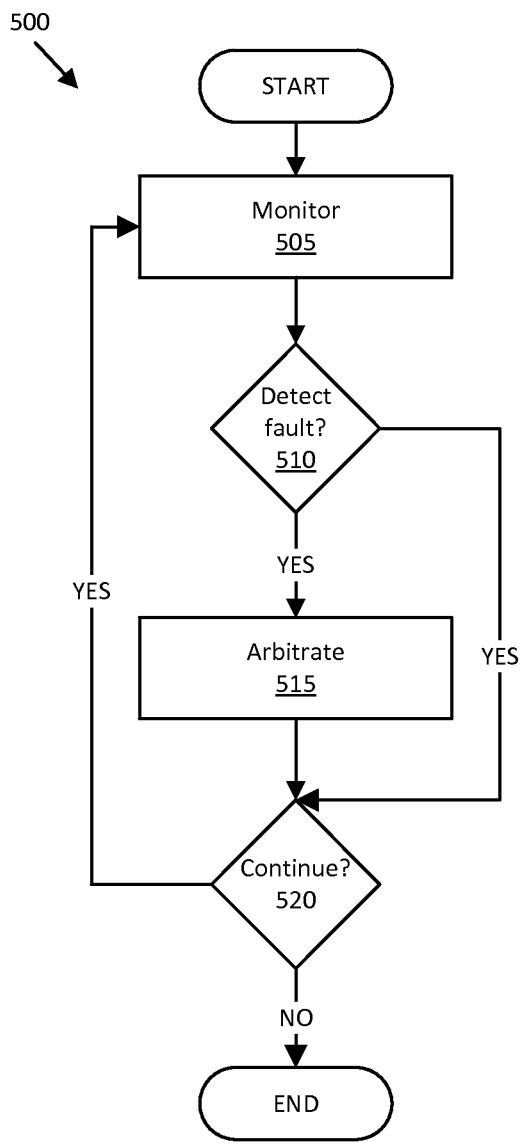
FIG. 5 is a diagram of an example process for failure management in a vehicle.

FIG. 5 illustrates an example of a process 500 for arbitrating between a pair of failsafe devices such as devices 106, 107, devices 111, 112, etc. The process 500 begins in a block 505, in which a first device 106, 107, for example, monitors communications with a second device 106, 107 on an arbitration bus 135, and also internally monitors itself, to detect a fault.

In a block 510, following the block 505, the first device 106, 107, determines whether a fault is detected. If so, the process 500 proceeds to a block 515. Otherwise, the process 500 proceeds to a block 520.

In the block 515, the first device 106, 107 executes programming to address the detected fault. For example, if the second device 106, 107 has reported a fault, or has stopped communicating, then the first device 106, 107 may assume operations of the second device 106, 107, may cease communications with the second device 106, 107, may report a fault in the device 106, 107 via one of the buses 130, 131, etc. Alternatively, if the first device 106, 107 has detected an internal fault, then the device 106, 107 may report the fault via the arbitration bus 135.

Following either of the blocks 510, 515, in a block 520, is determined whether the process 500 should continue. For example, if a device 106, 107 has detected an internal fault, then the device 106, 107 generally reports the fault and stops the process 500. The process 500 may end under other conditions, e.g., when a vehicle 101 is powered off. In any event, if the process 500 is to continue, then control returns to the block 505. Otherwise, the process 500 ends.

Although the process 500 was described above with respect to devices 106, 107, it could be practiced in a sub-system 110, 115, 120, etc., e.g., in devices 111, 112, etc. Further, the process 500 could be executed in an arbitration bus 135, e.g., as mentioned above, a bus 135 could include or be communicatively coupled to a microprocessor capable of executing programming to carry out processes such as the process 500.

The systems and methods disclosed herein are generally described in the context of a vehicle. However, it should be clear that many of the disclosed concepts could be practiced in other contexts, and the subject matter of this disclosure is not necessarily limited to the context of a vehicle.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, sub-systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed sub-systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle system including a control sub-system, the control sub-system comprising:
    first and second failsafe devices, each of the failsafe devices comprising a processor and a memory, the memory storing instructions executable by the processor for performing at least one of detecting a fault and providing a communication concerning a fault; and
    an arbitration bus connecting the first and second failsafe devices, and wherein the communication concerning the fault is provided from a first one of the first and second failsafe devices to a second one of the first and second failsafe devices via the arbitration bus,
    wherein one of the first and second failsafe devices selects one of a plurality of communication buses for communication with at least one component sub-system based at least in part on the communication concerning the fault received over the arbitration bus.

2. The vehicle system of claim 1, wherein the at least one component sub-system is communicatively coupled to the first failsafe device via one of the plurality of communication buses and to the second failsafe device via another of the plurality of communication buses.

3. The vehicle system of claim 2, wherein the plurality of communication buses includes a first communications bus and a second communications bus, the first and second communications buses being distinct from the arbitration bus.

4. The vehicle system of claim 3, the at least one vehicle component sub-system including third and fourth failsafe devices, each of the third and fourth failsafe devices comprising a processor and a memory, the memory storing instructions executable by the processor for performing at least one of detecting a fault in providing a communication concerning the fault.

5. The vehicle system of claim 4, further comprising an arbitration sub-system, the arbitration sub-system including first and second failsafe devices.

6. The vehicle system of claim 3, where the first failsafe device monitors communications over the first communication bus and the second failsafe device monitors communications over the second communication bus, and wherein the first failsafe device selects the first communication bus for communication with the component sub-system in response to the communication concerning the fault received from the second failsafe device over the arbitration bus.

7. The vehicle system of claim 1, wherein the first failsafe device is powered by a first power source and the second failsafe device is powered by a second power source.

8. The vehicle system of claim 1, wherein each of the first and second failsafe devices are programmed for substantially performing operations of the subsystem that are performed by the other failsafe device under normal conditions, detecting a fault, and providing a communication concerning a fault.

9. The vehicle system of claim 1, wherein the system is in a vehicle and the control subsystem is an autonomous vehicle control subsystem.

10. A system in a vehicle, comprising:
    a first subsystem comprising first and second failsafe devices;
    a second subsystem comprising third and fourth failsafe devices;
    a first communications bus and a second communications bus; and
    a first arbitration bus connecting the first and second failsafe devices, wherein the communication concerning the fault is provided from a first one of the first and second failsafe devices to a second one of the first and second failsafe devices over the first arbitration bus;
    wherein each of the failsafe devices comprising a processor and a memory, the memory storing instructions executable by the processor for performing at least one of detecting a fault and providing a communication concerning a fault; and
    the first and third failsafe devices are communicatively connected via the first communications bus and the second and fourth failsafe devices are connected via the second communications bus,
    wherein one of the first and second failsafe devices selects one of the first and second communication bus for communication with at least one of the third and fourth failsafe devices based at least in part on the communication concerning the fault received over the arbitration bus.

11. The system of claim 10, further comprising a second arbitration bus connecting the third and fourth failsafe devices, wherein the communication concerning the fault is provided from a first one of the third and fourth failsafe devices to a second one of the third and fourth failsafe devices over the second arbitration bus.

12. The system of claim 10, wherein the first subsystem is an autonomous operation subsystem and the second subsystem is one of a powertrain subsystem, a brake subsystem, a steering subsystem, and a lighting subsystem.

13. The system of claim 10, further comprising a plurality of second subsystems.

14. The system of claim 10, wherein the first failsafe device is powered by a first power source and the second failsafe device is powered by a second power source.

15. The system of claim 10, wherein each of the first and second failsafe devices are programmed for substantially performing operations of the subsystem that are performed by the other failsafe device under normal conditions, detecting a fault, and providing a communication concerning a fault.

16. A system in a vehicle, comprising:
an autonomous operation subsystem comprising first and second failsafe devices in communication over an arbitration bus;
a second subsystem;
a first communications bus and a second communications bus;
wherein each of the failsafe devices comprising a processor and a memory, the memory storing instructions executable by the processor for performing at least one of detecting a fault and providing a communication concerning a fault; and
each of the failsafe devices are further programmed to transmit the communication concerning the fault to the other failsafe device over the arbitration bus and, in the event of a fault in the other failsafe device, provide at least some communications to the second subsystem, over one of the first communication bus and the second communication bus, that the other device is programmed to provide,
wherein one of the first and second failsafe devices selects one of the first and second communication bus for communication with the second subsystem based at least in part on the communication concerning the fault received over the arbitration bus.

17. The system of claim 16, wherein the first failsafe device is powered by a first power source and the second failsafe device is powered by a second power source.

18. The system of claim 16, wherein each of the first and second failsafe devices are programmed for substantially performing operations of the subsystem that are performed by the other failsafe device under normal conditions, detecting a fault, and providing a communication concerning a fault.

* * * * *